Feb. 16, 1954 J. B. OWENS 2,669,622
SWITCH OPERATING MECHANISM
Filed Nov. 3, 1949 5 Sheets-Sheet 1

WITNESSES:
E. A. McCloskey
G. T. Stratton

INVENTOR
James B. Owens.
BY Ralph H. Swingle
ATTORNEY

Feb. 16, 1954  J. B. OWENS  2,669,622
SWITCH OPERATING MECHANISM
Filed Nov. 3, 1949  5 Sheets-Sheet 5

WITNESSES:
E. A. McCloskey
Q. T. Stratton

INVENTOR
James B. Owens.
BY
Ralph H. Swingle
ATTORNEY

Patented Feb. 16, 1954

2,669,622

UNITED STATES PATENT OFFICE 2,669,622

SWITCH OPERATING MECHANISM

James B. Owens, East McKeesport, Pa., assignor to Westinghouse Electric Corporation, East Pittsburgh, Pa., a corporation of Pennsylvania Application November 3, 1949, Serial No. 125,209

13 Claims. (Cl. 200—92)

This invention relates, generally, to operating mechanism for electric switches, and more particularly, to power operated mechanisms of this type.

These mechanisms for operating switches usually include an electric motor operating through reduction gearing to move the switches to their open and closed circuit positions, and, of course, during operating of the switches it is necessary to arrest their motion rather precisely at their defined open and closed circuit positions. This has been accomplished by providing solenoid operated motor brakes energized to release the braking when the motor is energized. However, such brakes have generally required high currents to release them and have been correspondingly difficult to release when it is desired to effect manual operation of the motor mechanism.

Accordingly, one object of this invention is to provide a novel solenoid operated braking arrangement for motor operated mechanisms for switches, which is capable of high braking effort with relative ease in operation.

Another object of this invention is to provide a novel braking arrangement having efficient braking action and being of a self-energizing type.

Another reason why precise braking action is important in switch operating mechanism of the type described, is that such mechanisms are often remotely controlled and consequently desirably include switch means operated by the mechanism for transmitting intelligence back to the remote operating point.

It is another object of this invention, therefore, to provide in conjunction with power operating mechanism for switches having brake means for precision stopping of such mechanism and manual means for uncoupling the switches from the braked mechanism and for operating the switches, novel means for selectively connecting control means to be responsive to positioning of the switches either dependently or independently of the braked motor mechanism proper.

Another object of this invention is to provide in motor operated mechanisms for switches having manual means to operate the switches independent of the motor mechanism, novel means for selectively connecting control means to be operated either dependently or independently of the motor mechanism.

These and other objects of this invention will become apparent upon consideration of the following detailed description of a preferred embodiment thereof, when taken in connection with the attached drawings, in which:

Figure 1:
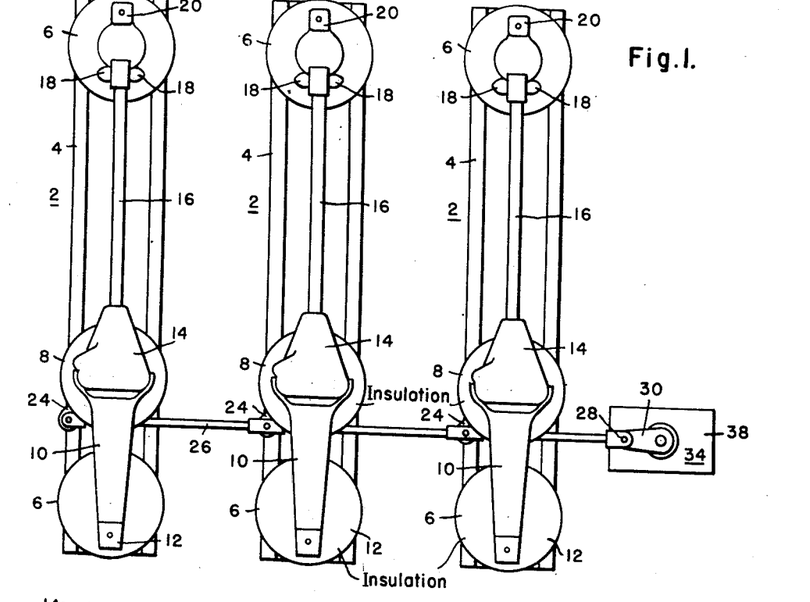
Fig. 1 is a top view of a three-pole disconnecting switch installation operated by mechanism in accordance with this invention.
Figure 2:
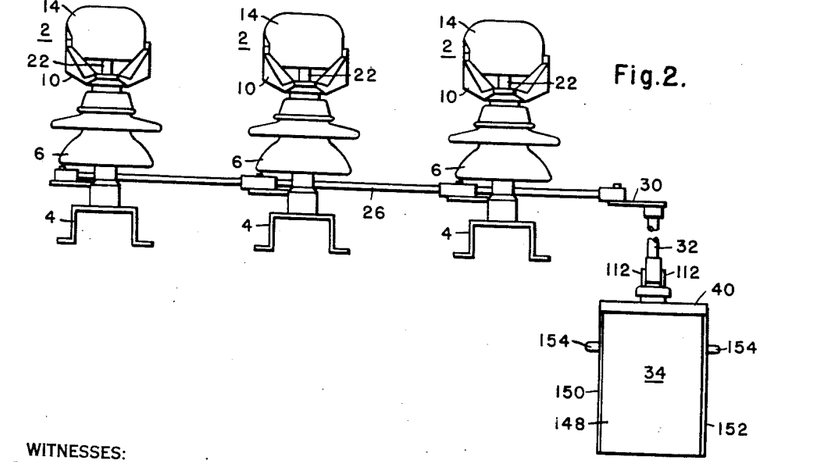
Fig. 2 is an end elevational view of the switch installation shown in Fig. 1.

While this invention may be used in the operation of various types of electric switching devices, it is illustrated in Figs. 1 and 2 in connection with the operation of a plurality of disconnecting switches 2, which are generally mounted on an elevated support, such as on poles or elevated framework, at a substation or the like.

Each of the disconnecting switches 2 is adapted to be mounted on a flanged channel base 4, which has a stationary insulator 6 mounted at each end thereof, and a rotatable insulator 8 mounted adjacent one of the stationary insulators 6. The rotatable insulator 8 is joined at its upper end by a supporting brace 10 to the adjacent stationary insulator 6, and this supporting brace has a terminal pad 12 at the outer end thereof for attachment of a terminal conductor thereto. The upper end of rotatable insulator 8 has a stub shaft 22, and a journal portion which is rotatably received in a bearing provided in supporting brace 10. Operating mechanism for the switch blade 16 is enclosed in a housing 14 which is pivotally mounted on brace 10 on an axis which extends transversely of the blade and the outer end of switch blade 16 is adapted to be received in pressure engagement with break contact jaws 18 at the closed circuit position of the switch. Contact jaws 18 are secured to the upper end of the other stationary insulator 6, on a fixture which includes a second terminal pad 20 for connection of another line conductor to the switch. For a more complete description of the particular switches illustrated and their mode of operation, reference is hereby made to H. L. Rawlins Patent No. 2,363,360, issued November 21, 1944, to the same assignee as this invention.

Generally speaking, the switches are operated to their open and closed circuit positions by rotation of their insulators 8 in opposite directions. Rotation of insulator 8 of any of the switches in a counterclockwise direction as viewed in Fig. 1, results first in rotation of the switch blades 16 about their longitudinal axes to relieve the pressure on contact jaws 18 due to a connection of insulator shaft 22 with the blades in mechanism housing 14, and thereafter the blades are pivotally raised about the transverse axis on which mechanism housing 14 is mounted on supporting brace 10, due to a connection of stub shaft 22 to the housing 14. Rotation of insulators 8 in the opposite clockwise direction will close the switches and cause movement of the switch blades 16 in the reverse sequence, namely, they will pivotally move down to a position between contact jaws 18 with mechanism housing 14, and thereafter the blades will be rotated about their longitudinal axes into high pressure engagement between contact jaws 18.

Each of the rotatable switch insulators 8 has a crank arm 24 secured thereto, and as shown in Fig. 1, these crank arms are connected by an operating link 26 pivoted to the outer end of each crank arm, and this link in turn is pivoted as at 28 to the outer end of an operating crank 30 secured to the upper end of an operating shaft 32. The operating shaft 32 extends vertically downwardly, preferably to a location accessible by an operator from the ground, to be connected to motor operating mechanism 34, which is adapted to rotate operating shaft 32 in opposite directions, to effect opening and closing of the disconnecting switches 2.

The operating mechanism 34 is shown as being mounted in a housing including a stationary part comprising a rear wall 36 of sheet metal having an integral top wall 38, which terminates at the front and opposite sides in a depending marginal flange 40. Rear wall 36 of the housing also has forwardly projecting side flanges 45 which, together with flanges 46 form vertical grooves for receiving the casing cover to be hereinafter described. Vertical flanges 46 are formed on the side edges of a bracing plate 48 which is secured in closely spaced relation directly to rear wall 36, as by studs 50 secured to the bracing plates, and having collars 52 spacing the bracing plate from rear wall 36.

The bottom wall 54 of the housing is formed by a flanged base plate secured to bracing plate 48, in any desired manner, for example, as by welding or the like. The front flange of bottom wall 54 is formed with a substantially centrally located locking lug 56 (Figs. 3 and 4) for supporting the housing cover, in a manner to be described. Mounted on bottom wall 54 of the housing are a plurality of supporting brackets 58 and 60 for supporting terminal blocks 62 to which connections for the various electrically energized components of the operating mechanism may be made. A support 64 is also mounted on bottom wall 54 and this support may have a circuit breaker 66 mounted thereon for protecting the electrically energized components of the mechanism, and support 64 may also have a rearwardly extending portion on which a relay or contactor may be mounted where operation from a remote point is desired.

The drive motor 68 for the operating mechanism is adapted to be mounted on bracing plate 48 above terminal blocks 62, with the motor drive shaft 70 arranged vertically. The motor drive shaft 70 may be provided with a suitable brake, and this may comprise a metal brake disc 72 having a square opening at its center for receiving a square sleeve 71 secured on motor shaft 70. Brake disc 72 is thus slidably but non-rotatably mounted on the motor shaft, so that the brake disc may float in a vertical direction. Brake disc 72 cooperates with a pair of brake shoes 74 and 76, each of which may comprise a metal backing plate lined with any suitable friction brake material, such, for example, as an asbestos composition. The lower brake shoe 74 is the stationary shoe, but is mounted for pivotal movement on a pivot pin 73 secured to bracing plate 48 as by a bolt 75. The upper movable brake shoe 76 is also pivotally mounted at 77 on an operating lever 78, with the brake shoe pivots 73 and 77 being mounted on substantially parallel axes. Operating lever 78 is pivotally mounted at a point 79 closely adjacent the pivot 77 for brake shoe 76, with the pivot 79 for the operating lever being also supported on bracing plate 48, as by a bolt 81. The inner end of operating lever 78 is connected with a substantially cylindrical solenoid core 85 having a split upper end for receiving the inner end of operating lever 78 between a pair of pins 87 which extend across the split upper end of the solenoid core. A solenoid coil 89 is provided with a substantially central cylindrical opening lined by guide sleeve 91, which should be of a non-magnetic material, preferably a molded insulating material with the core and guide sleeve being supported in a substantially U-shaped supporting frame having upper and lower supporting legs 93 and 95, respectively. The lower end of the opening in solenoid coil 89 and guide sleeve 91 is closed by an adjustable stationary core 97, which should be of a magnetic material such as soft iron, and this core has a non-sticking washer 99 resting on top of a non-magnetic material to prevent sticking of core 85 when it is drawn down into engagement with stationary core plug 97 upon energization of coil 89. A brake setting spring 101 normally biases solenoid core 85 upwardly, being mounted on the core and reacting between an upper collar 103 seated on pin 87, and a lower collar 105 seated on the upper arm 93 of the solenoid support.

Figure 7:
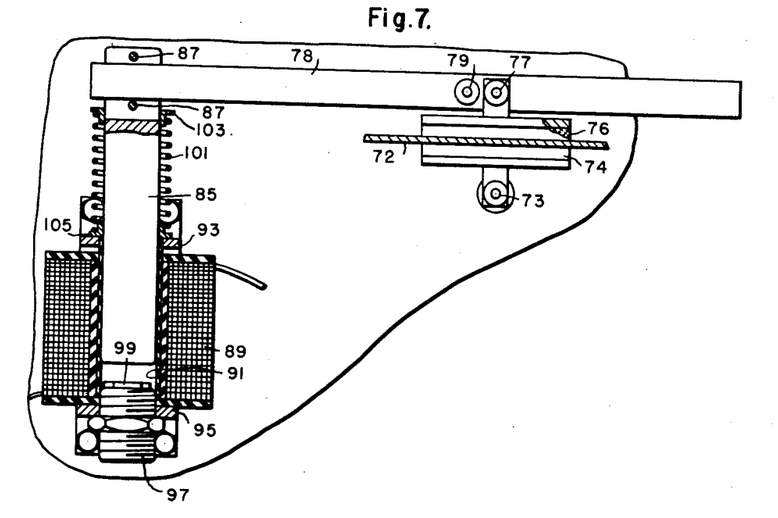
Fig. 7 is a front elevational view partly in section illustrating the brake for the operating mechanism.
Figure 8:
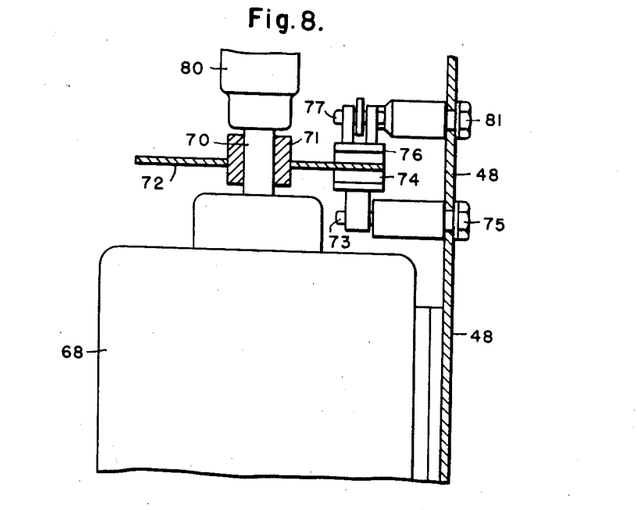
Fig. 8 is a side elevational view partly in section of the braking mechanism shown in Figure 7.

As previously pointed out, brake disc 72 floats on the motor shaft and between movable brake shoe 76 and relatively stationary brake shoe 74, so that the brake setting force exerted by spring 101 results in a braking effort approximately double that which would be obtained if but a single brake shoe of the same size were employed. It should also be noted that due to the pivotal mounting 73 and 77 of the brake shoes, they are at least partially self-energizing, irrespective of the direction of motor rotation, because rotation of brake disc 72 in either direction tends to rotate the brake shoes about their pivotal mountings 73 and 77, and this obviously will tend to force the trailing edges of the brake shoes into firmer engagement with brake disc 72. Moreover, operating lever 78 has a high mechanical advantage due to positioning of its supporting pivot 79 closely adjacent the mounting of movable brake shoe 76 thereon, and since the force exerted by spring 101 is thus multiplied, preferably about ten times, it is apparent that a relatively light spring 101 may be employed, and this makes possible the use of a relatively small low-current solenoid coil for releasing the brake. It is obvious that when solenoid coil 89 is energized it will pull core 85 downward and thus raise movable brake shoe 76 to release brake disc 72. Also, when solenoid coil 89 is deenergized and its parts are positioned as shown in Figure 7, spring 101 will cause movable brake shoe 76 to move into engagement with brake disc 72, which in turn is moved down into pressure engagement with fixed brake shoe 74. It should also be noted that any wear on brake shoes 74 and 76 is automatically compensated for by increased travel of spring 101. Of course, this causes core 85 to move further away from core plug 97 and, consequently, reduces the pull of solenoid coil 89 when it is energized. Eventually after considerable wear core 85 will have moved far enough away from plug 97 that the solenoid coil will not be able to release the brake, and at this time it will be necessary to adjust threaded core plug 97 upwardly to restore the original air gap to give proper operation. After adjustment, core plug 97 may be secured in its new position by the lock nuts mounted thereon.

During adjustment of the complete motor mechanism it is often desirable to release the brake so that the mechanism may be turned by hand. For this purpose it should be noted that brake operating lever 78 is extended outwardly beyond the brake shoes and motor shaft 70 to the right as viewed in Figures 3 and 7 of the drawings, to form a simple and convenient brake release handle. It is only necessary to pull upwardly on the outer extension of operating lever 78 to release the brake completely. The brake disc 72 then forms a convenient hand wheel to aid in turning the operating mechanism by hand.

Figure 3:
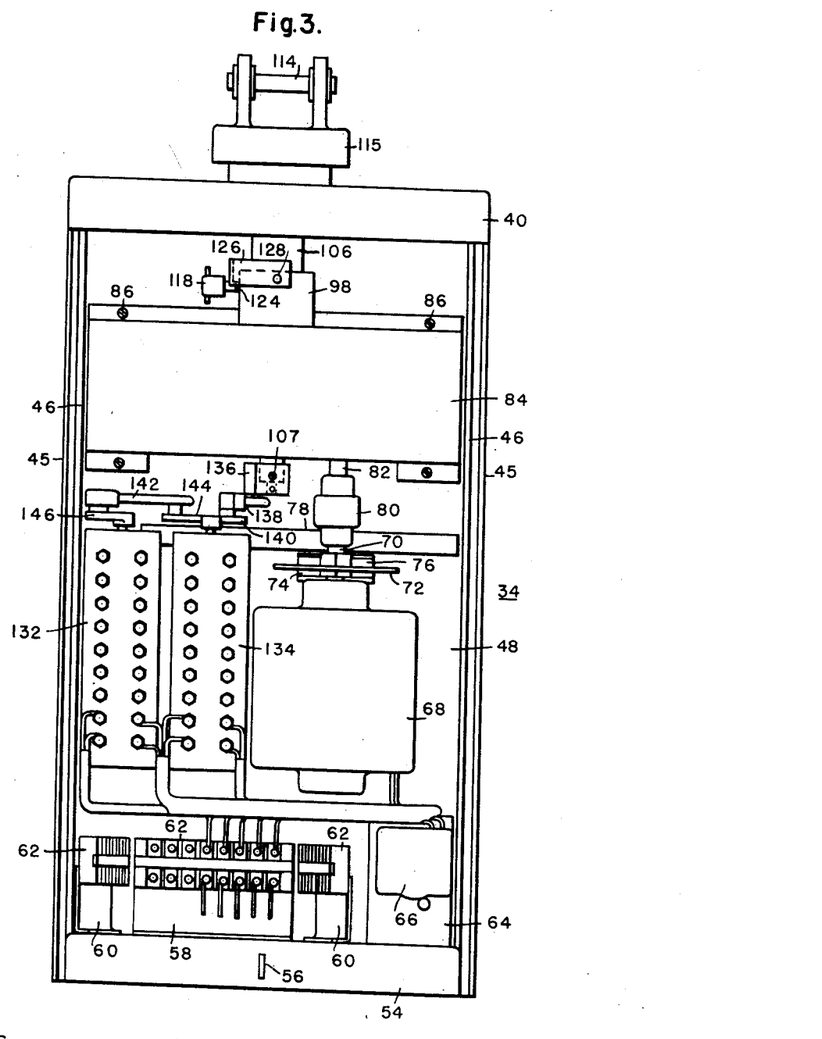
Fig. 3 is an enlarged elevational view of the switch operating mechanism and its housing with the housing cover removed.
Figure 4:
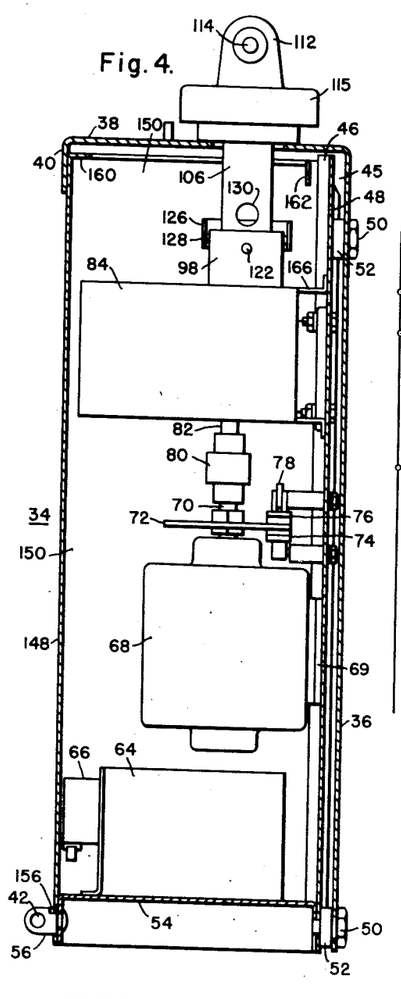
Fig. 4 is a vertical cross-section view through the operating mechanism housing shown in Fig. 3, taken substantially at right angles to Fig. 3, but showing the mechanism in the housing in elevation.

The upper end of motor shaft 70 is coupled with an input shaft 82 of a gear train by any suitable means, preferably a universal type joint 80. By reference to Fig. 6, it will be observed that the gear train is supported between spaced journal plates 83 and 88, with the whole gear train being enclosed in a substantially U-shaped gear housing 84, having flanged ends secured to bracing plate 48 on the rear wall of the housing, for example, as by screws 86 (Fig. 3).

Figure 6:
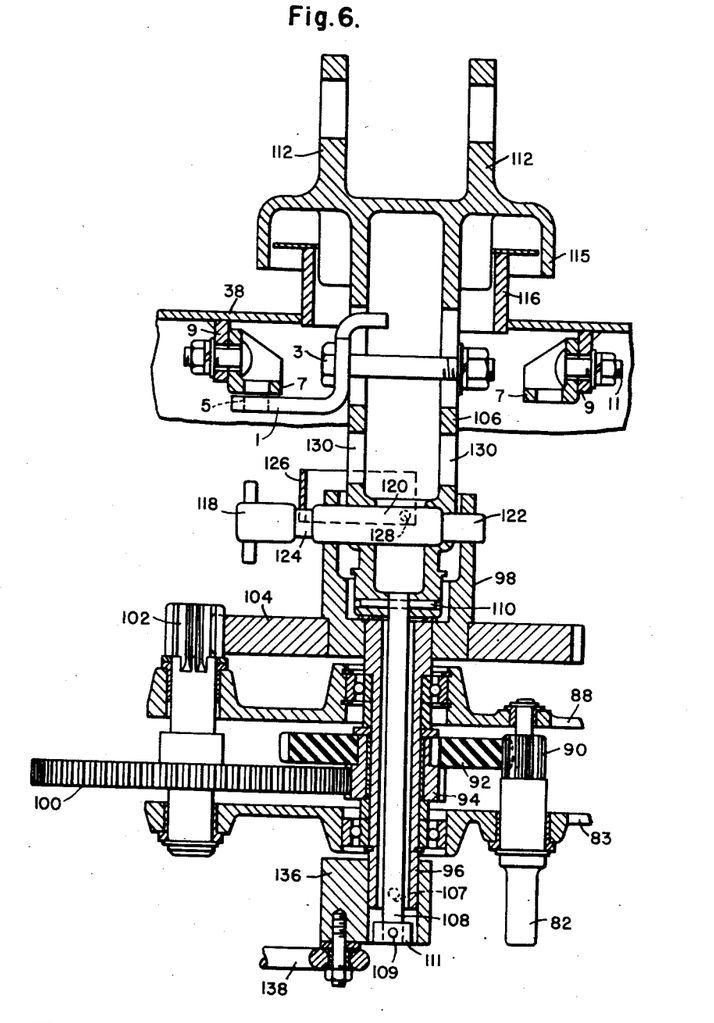
Fig. 6 is an enlarged cross-section view of part of the switch operating mechanism.

The input shaft 82 of the gear train is journaled in both plates 83 and 88, and has a pinion 90 thereon adapted to mesh with a gear 92, preferably of a molded composition material, to reduce noise. Gear 92 is keyed to the hub of a pinion 94, with the latter being rotatably mounted on a hollow shaft 96. Hollow shaft 96 is secured at its upper end to an enlarged hollow output shaft 98 for the gear train, as will be hereinafter apparent. Pinion 94 meshes with a large gear 100 and this, in turn, is mounted on a shaft having a pinion 102 which engages a gear 104 secured on output shaft 98. A hollow shaft 106 comprises the output shaft from the entire operating mechanism, and the lower end of this shaft is reduced in size and is received in output shaft 98 for the gear train, and has a shaft 108 secured to the lower end thereof, as by a pin 110, with the shaft 108 extending downwardly through hollow shaft 96, all for a purpose to be described. The upper end of output shaft 106 has a pair of spaced apertured ears 112 formed integral therewith for receiving a connecting pin 114 for connecting operating shaft 32 therewith. Preferably top wall 38 of the mechanism housing has a sleeve 116 secured thereto, and the upper end of the output shaft 106 may have an integral skirt 115 extending over the upper end of sleeve 116.

In order to couple mechanism output shaft 106 to gearing output shaft 98, a coupling pin 118 is provided and it will be noted that this pin has an enlarged cross-section portion 120, intermediate its ends, with an outer portion 122 thereof of reduced cross-section area. In the position of the parts shown in Fig. 6, it will be observed that the openings in output shafts 98 and 106 at the left are of a size to closely receive the large cross-section portion 120 of coupling pin 118, whereas the openings in these shafts at the right are reduced to closely receive the small cross-section part 122 of coupling pin 118. It will thus be obvious that coupling pin 118 can be inserted to couple output shafts 98 and 106 only when these shafts are in the relative angular positions shown in Fig. 6 of the drawings. Coupling pin 118 is also provided with an annular groove 124 adjacent its inner end for receiving an edge of a generally U-shaped lock member 126, which, in turn, receives gearing output shaft 98, and has its ends pivotally mounted on this shaft, as at 128. It will also be noted that openings 130 are provided through mechanism output shaft 106 immediately above the upper end of gearing output shaft 98, and these openings are designed of a size to receive an operating bar which may be manually moved.

In the position of the parts shown in Fig. 6, it will be apparent that motor 68 will drive the output shafts by way of pinion 90, gear 92, pinion 94, gear 100, pinion 102, gear 104, to gearing output shaft 98, and thence by means of coupling pin 118 to mechanism output shaft 106. Incidentally, hollow shaft 96 and shaft 108 will also be operated inasmuch as the former is secured to gearing output shaft 98, and the latter is secured to mechanism output shaft 106. Now, if it is desired to manually operate mechanism output shaft 106, it will be necessary to raise lock member 26 out of groove 124 in coupling pin 118, so that the coupling pin may be removed, and mechanism output shaft may be moved independently of the gear train. It will be observed that it is not possible to insert a manual operating bar in apertures 130 of mechanism output shaft 106 until coupling pin 118 is withdrawn, because the pin maintains lock member 126 in a position where it obstructs access to the openings 130 from the left side (Figs. 3 and 6), which is the side an operating bar would have to be inserted to open switches 2. Of course, when coupling pin 118 is removed in the manner set forth above, lock member 126 will drop down until it engages the side of gearing output shaft 98, where it will be down below openings 130 and will no longer obstruct insertion of a manual operating bar in openings 130 of the mechanism output shaft 106. Following manual operating of mechanism output shaft 106, it will be impossible for the reasons previously pointed out to insert coupling pin 118 to connect this shaft to gear output shaft 98 until the two shafts are aligned in the particular angular relation shown in Fig. 6. This is of importance for reasons which will be hereinafter referred to.

Mechanism output shaft 106 has provision for locking it in the position it occupies when disconnecting switches 2 are at their open and closed circuit positions comprising, a lock bracket 1 secured to shaft 106 by a bolt 3. The outer end of lock bracket 1 has an opening 5 and is adapted to underlie openings in stationary brackets which are secured by bolts 11 to lugs 9 rigidly secured to top wall 38 of the housing. Whenever the opening 5 is aligned with the opening in a bracket 7, a padlock may be inserted through the aligned openings to thus positively lock the disconnecting switches in either the open or closed circuit position, irrespective of whether coupling pin 118 is in place or not.

For the purpose of controlling operation of motor 68, for example, to energize and deenergize it in response to 180° rotation of output shaft 98 or 106, or both, as well as for the purpose of energizing indicating circuits to indicate the position of the mechanism and hence the position of switches 2 at a remote point, there is provided in the mechanism housing, a pair of control switches 132 and 134 also mounted on bracing plate 48 at a point adjacent to and at one side of motor 68. Each of these switches may have rotatable contact actuating means adapted to be actuated by a crank 136 mounted on hollow shaft 96. Provision is made for connection of crank 136 with either the hollow shaft 96 which is connected with the output shaft 98 of the reduction gearing, or to shaft 108 which is connected directly with hollow output shaft 106 for the entire mechanism. Thus, crank 136 may be connected to hollow shaft 96 by a set screw 107, or it may be connected to shaft 108 by a removable pin 109 extending through the crank and through a collar 111 secured on the lower end of shaft 108. In either case, crank 136 is connected to control switch 134 by a connecting link 138 pivotally associated with a crank 140 on the rotatable operating shaft on switch 134. This shaft may be also provided with a second crank 144 connected by a link 142 to a crank 146 on the operating shaft for control switch 132, to effect simultaneous operation of the two control switches in accordance with movement of either or both output shafts 106 and 98. It will be obvious from the structure herein described that if operating crank 136 is secured to shaft 108 by pin 109, the switches will be actuated in accordance with movement of the mechanism output shaft 106, and consequently will be moved in accordance with movement of disconnecting switches 2, irrespective of whether the mechanism output shaft 106 is operated by motor 68, or by a manual operating bar inserted in openings 130 of the mechanism output shaft when it is disconnected from gearing output shaft 98. On the other hand, if operating crank 136 for the control switches is secured solely to hollow shaft 96 by set screw 107 (pin 109 not being in place), then the switches will be operated solely in accordance with operation of gearing output shaft 98, and will not be operated at all during manual operation of switches 2 when it is disconnected from mechanism output shaft 106 upon withdrawal of coupling pin 118. Thus, it is apparent that the control switches 132 and 134 may be connected to the operating mechanism so that their positions will always correspond to the positions of the disconnecting switches, or alternatively they may be connected so that they correspond only to the positions of gearing output shaft 98, and will not be operated during manual operation of switches 2. It may be desirable to have a pin 109 which is threaded at one end so that it may be used as a set screw 107 when it is desired to couple crank 136 to shaft 96.

The cover 148 for the operating mechanism is substantially U-shaped in cross-section having opposite sides 150 and 152 with handles 154 mounted adjacent the upper ends of each of these sides. The top edge of cover 148 is provided with a flange 160 which extends inwardly across the front and for a substantial distance rearwardly along each side of the cover, with this flange terminating in downwardly turned locking lugs 162 at each side of the cover, for the purpose to be described. At the bottom of the front part of cover 148, there is provided an opening 156 adapted to receive latch lug 56 provided on the front flange of bottom wall 54 of the housing, when the cover is at its upper position wherein it completes the enclosure of the operating mechanism, in cooperation with top wall 38, rear wall 36, and bottom wall 54.

In the closed position, it will thus be seen that cover 148 is supported by tongue 156 on bottom wall 54 of the housing, and may be locked in this position by a padlock or the like inserted through the opening in locking lug 56. It will be apparent that the cover may be entirely moved from the housing by merely grasping handles 154 and lifting upwardly until latch tongue 156 clears the bottom of openings 156, when the bottom of the cover may be swung outwardly and the entire cover let down and entirely removed from the housing. In applying the cover, it is simply moved upwardly into engagement with the underside of top wall 38 whereupon latch lug 56 may move into opening 156 in the cover, and then the cover may be dropped down and will remain in the closed position shown in Fig. 4. It will be observed that in this position flange 40 of top wall 38 completely encloses the upper end of cover 148, and the side edges of the cover are received in the spaces between flanges 45 and 46 on rear wall 34 and bracing plate 48, to thus form a completely weatherproof housing for the mechanism.

It will also be observed that the only part of the mechanism exposed is the upper end of the output shaft 106, namely, the connecting ears 112 thereof and skirt 115 which protects the opening in top wall 38, through which the output shaft projects. Moreover, the coupling pin 118 being located within the housing is, together with the parts associated therewith, completely protected from the weather, and when a padlock is inserted in locking lug 56, it prevents access to all of the mechanism within the housing including coupling pin 118 and parts associated therewith for permitting manual operation of mechanism output shaft 106. Now, when it is desired to manually operate output shaft 106, the cover may be raised to release latch tongue 56 as described above and then dropped straight down until the flange 160 rests on gear housing 84. It will be observed that inner portions of the gear housing are cut away as at 166 to receive locking lugs 162 to prevent accidental displacement of the cover from this partially open position where only the means for uncoupling output shafts 98 and 106 is exposed. In this position of the cover (not shown) the manual operating mechanism is exposed on three sides, but the remainder of the mechanism is still substantially entirely enclosed so as to be protected from rain, sleet or snow. Moreover, at the partly open position of the cover, the switch may be manually uncoupled by withdrawing pin 118 in the manner previously described and the operating bar may then be inserted in openings 130 of mechanism output shaft 106 and the latter is thus freed to be rotated manually the 180° required for operation of disconnecting switches 2 to their open and closed positions. Moreover, after the switches have been uncoupled from the motor operating mechanism including the gearing in this manner, and manually operated, the handle can be removed and the cover raised to its fully closed position and locked. This prevents unauthorized persons from operating the switch either electrically or manually. Of course, at any time mechanism output shaft 106 can be locked at its extreme positions by means of bracket 1. Moreover, if it is desired to inspect or repair any of the mechanism, the cover 148 may be entirely removed from the housing either from its fully enclosed position shown in Fig. 4, or from its partly open position. This particular cover construction and its cooperation with the other parts of the mechanism and switches are claimed in the copending application of J. B. Owens and E. F. Beach on Switch Operating Mechanism, Ser. No. 125,208, filed Nov. 3, 1949, and assigned to the same assignee as this invention.

Figure 5:
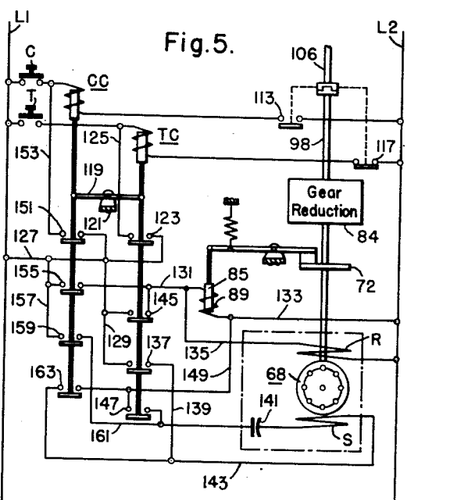
Fig. 5 is a diagrammatic view of the mechanism and an electrical control circuit therefor.

Referring to Fig. 5 of the drawings, it will be observed that the operating mechanism has the electrically energized components thereof supplied from supply conductors L1 and L2. The mechanism has two energizing circuits, one for closing switches 2 controlled by a push button C which may be located at a remote location for energizing the coil of a contactor CC, with energization of this coil being also dependent on whether or not contacts 113 are at their open or closed circuit position. The contacts 113 may comprise one set of contacts of control switches 132 and 134, and, as previously pointed out, the contacts of these switches are operated in accordance with the position of mechanism output shaft 106, or gearing output shaft 98. The other control circuit for the mechanism and for opening switches 2 is adapted to be energized by a normally open push button switch T, for energizing the coil of a contactor TC, with the energizing circuit of the coil being dependent on the condition of contacts 117 which may comprise another set of contacts of control switches 132 and 134. However, contacts 113 and 117 may be entirely separate limit switches operated by the gearing output shaft 96.

In order to insure alternate operation of contactors CC and TC, their armatures are provided with a mechanical interlock lever 119 pivotally secured to each armature rod and pivotally mounted at 121 intermediate its ends. With the disconnecting switches 2 at their closed position, the contacts 113 of the control switches will be at the open position illustrated, whereas contacts 117 of these switches will be closed, so that the only circuit which can be energized by the push buttons is that for the coil of the opening contactor TC. Assuming that push button T is depressed to energize the coil of opening contactor TC, it will be observed that this contactor will operate to close a set of contacts 123 to establish a holding circuit by-passing push button T by means of a conductor 125 and a conductor 127 connected to supply conductor L1. Contactor TC also closes a second set of contacts 145 thereby establishing a circuit from supply conductor L1 by way of conductors 127 and 129 through contacts 145, then by way of a conductor 131 to brake release coil 89, and then by conductor 133 to the other supply conductor L2. Contacts 145 also energize the running winding R of motor 68 by means of a conductor 135 connected to supply conductor L2 in parallel with brake release coil 89. A third set of contacts 137 closed upon energization of contactor TC connects supply conductor L1 by way of conductors 127 and 129 to one side of the starting winding S of motor 68 by way of a conductor 139 and 143. The other side of starting winding S is connected in series with a condenser 141 and then by way of a conductor 161 through still another set of contacts 147 which are closed by contactor TC, and thence by way of conductors 149 and 133 to supply conductor L2.

With the motor 68 thus energized to rotate switch operating shaft 106 in a direction to open the switches, the motor will continue to operate until control switches 132 and 134 are operated to open contacts 117, and at substantially the same time contacts 113 are closed to thus prepare the closing circuit for motor 68. Of course, opening of control switch contacts 117 deenergizes the coil of contactor TC permitting its armature to drop down and open all of its contacts 123, 145, 137 and 147.

After the disconnecting switches 2 have been opened in the manner pointed out above, they may be closed by depressing push button switch C to thus energize the coil of contactor CC through the now closed control switch contacts 113. This causes the armature of contactor CC to be drawn upwardly to close its contacts, the first of which 151 establishes a holding circuit for the contactor by way of conductors 153 and 127 to supply conductor L1. A second set of contacts 155 which are closed upon energization of contactor CC operates to connect supply conductor L1 by way of conductors 127 and 157 through contacts 155, and then by conductor 131 to the parallel circuit of brake release coil 89 and running winding R of motor 68, to supply conductor L2. Another set of contacts 159 which are closed by energization of contactor CC acts, together with contactor contacts 163, to connect the starting winding S of motor 68 in a reverse manner between supply conductors L1 and L2 from that in which it is connected by energization of contactor TC. This circuit may be traced from supply conductor L1 by way of conductors 127 and 157, through contacts 159, and then by a conductor 161 to one side of starting winding S, and then by conductor 143 through contacts 163 and conductors 149 and 133, to supply conductor L2. This circuit thus energizes motor 68 to run in the opposite direction from its switch opening movement to close disconnecting switches 2, and the motor will continue then to operate until the switches are closed when control contacts 113 will be opened and contacts 117 will be closed to be restored to the positions shown in Figure 5 of the drawings.

It will be apparent from the foregoing that the control circuit for the mechanism is such that the brake release coil 89 is energized simultaneously with energization of motor 68, and is deenergized simultaneously with deenergization of the motor. While only two sets of switch contacts are shown in Figure 5 which may be contacts of control switches 132 and 134, it is obvious that the other contacts of each of these switches may be used to energize any number of circuits which may be desired for the purpose of controlling circuits of indicator lamps or other types of signals to indicate, for example, at the same location as push button switches C and T, the position of disconnecting switches 2; or if the switches are connected for operation solely by hollow shaft 96, such circuits will then indicate the position of the gearing output shaft 98.

It is also apparent that the particular brake disclosed herein is of a type which requires but a relatively light energizing spring, so that release of the brake may be accomplished by a small low current solenoid release. As a matter of fact, the brake arrangement is such that it is at least partly self-energizing when applied. Moreover, while it is usually desirable for safety reasons that the control switches be connected to the output shaft for the entire mechanism to thus always give a true indication of the position of the disconnecting switches, it is sometimes desirable to disconnect the disconnecting switches from the motor and gearing, and yet have the control switches coupled to the motor and gearing, so that the mechanism can be operated, for example, for testing purposes without disturbing the disconnecting switches. This is inherent in the construction disclosed herein, since these switches may be connected either to the output shaft 106 for the entire mechanism or merely to the output shaft 98 for the motor operated gearing.

Having particularly described a preferred embodiment of the invention in accordance with the patent statutes, it is desired that this invention be not limited to this particular arrangement, inasmuch as it will be apparent, particularly to persons skilled in the art, that many modifications and changes may be made in this particular construction without departing from the broad spirit and scope of this invention. Moreover, it will be apparent that various parts of the structure herein disclosed are usable in other environments, and with other types of mechanism, particularly the specific brake, and even the mode of connecting control switches to either of two operating shafts. Accordingly, it is desired that the invention be interpreted as broadly as possible, and that it be limited only as required by the prior art.

I claim as my invention:

1. A switch construction comprising a switch having separable contacts mounted on an elevated relatively inaccessible support, unitary operating mechanism mounted at a remote but relatively accessible location, said mechanism having an output shaft, motion transmitting means mechanically connecting said shaft and said switch, a reversible motor driving a reduction gear train, means releasably coupling said gear train and output shaft, a brake for said motor having a setting spring and solenoid release, control switch means for simultaneously energizing and deenergizing said motor and solenoid, and mechanical means for selectively connecting said control switch means to said gear train or to said output shaft to selectively operate the control switch means in accordance with the positions of the gear train or the switch contacts.

2. A switch construction comprising, a switch having separable contacts mounted on an elevated relatively inaccessible support, unitary operating mechanism mounted at a remote but relatively accessible location, said mechanism having an output shaft, motion transmitting means mechanically connecting said shaft and said switch, a reversible motor driving a reduction gear train, an output shaft for said gear train, means releasably connecting said output shafts, a brake for said motor having a setting spring and solenoid release, control switch means for simultaneously energizing and deenergizing said motor and solenoid, said output shafts having concentric end portions, and mechanical means for selectively connecting said control switch means with either of said output shaft end portions to selectively operate the control switch means in accordance with the positions of the gear train or the contacts of the switch.

3. A switch construction comprising, a switch having separable contacts mounted on an elevated relatively inaccessible support, unitary operating mechanism mounted at a remote but relatively accessible location, said mechanism having an output shaft, motion transmitting means mechanically connecting said shaft and said switch, a reversible motor driving a reduction gear train, an output shaft for said gear train, means releasably connecting said output shafts, a brake for said motor having a setting spring and solenoid release, control switch means for simultaneously energizing and deenergizing said motor and solenoid, said output shafts having concentric end portions with the inner projecting outwardly beyond the outer of said end portions, crank means for mechanically driving said control switch means, said crank means having an opening to receive both of said output shaft end portions, and securing means selective to secure the crank means to either of said output shaft end portions to selectively operate the control switch means in accordance with the positions of the gear train or the switch contacts.

4. A switch construction comprising a switch having separable contacts mounted on an elevated relatively inaccessible support, unitary operating mechanism mounted at a remote but relatively accessible location, said mechanism having an output shaft, motion transmitting means mechanically connecting said shaft and said switch, a reversible motor driving a reduction gear train, means releasably coupling said gear train and output shaft, a brake for said motor having a setting spring and solenoid release, said brake including relatively fixed and movable brake shoes engageable with opposite sides of a brake disc which is slidably but non-rotatably mounted on a shaft driven by said motor, control switch means for simultaneously energizing and deenergizing said motor and solenoid, and mechanical means for selectively connecting said control switch means to said gear train or to said output shaft to selectively operate the control switch means in accordance with the positions of the gear train or the contacts of the switch.

5. Motor operating mechanism for switches comprising, an upright housing, an output shaft for the mechanism projecting through the top wall of said housing, a motor operated gear train in the upper part of said housing having a hollow output shaft aligned with said mechanism output shaft and extending both above and below said gear train, manually operable means for releasably coupling said output shafts, and said mechanism output shaft having a portion extending freely through said gearing output shaft, control switch means in said housing below said gear train, and means for selectively mechanically operating said control switch means from the lower end portions of either of said output shafts.

6. Motor operating mechanism for switches comprising, an upright housing, an output shaft for the mechanism projecting through the top wall of the housing, a motor operated gear train in the upper part of said housing and having an output shaft, manually operated means located above said gear train for releasably coupling adjacent portions of said output shafts, said output shafts also extending to points beneath said gear train, control switch selective means in said housing below said gear train, and means for mechanically operating said control switch means from the lower end portions of either of said output shafts.

7. Motor operating mechanism for switches comprising, an upright housing, an output shaft for the mechanism projecting through the top wall of the housing, a gear train disposed in the upper part of said housing and having an output shaft, removable means located above said gear train for releasably coupling adjacent portions of said output shafts, said output shafts also extending to points beneath said gear train, control switch means in said housing below said gear train, selective means for mechanically operating said control switch means from the lower end portions of either of said output shafts, a motor having a shaft for operating said gear train, said motor being located in said housing beneath said gear train in side-by-side relation with said control switch means, a brake for said motor shaft, power operated means for actuating said brake located adjacent said control switch means, and a manually operable brake handle located at the opposite side of said housing.

8. Motor operating mechanism for switches hollow output shaft projecting at opposite sides of said gear train, an output shaft for the entire mechanism having a portion extending through said hollow output shaft, control switch means at one side of said gear train having a mechanical drive connection extending into proximity with the adjacent ends of said output shafts, crank means for selectively connecting said drive connection to the adjacent end of either output shaft, and coupling pin means at the other side of said gear train for releasably coupling said output shafts together.

9. Motor operating mechanism for switches comprising, a motor driven gear train having a hollow output shaft projecting at opposite sides of said gear train, an output shaft for the entire mechanism having a portion extending through said hollow output shaft, control switch means at one side of said gear train having a mechanical drive connection including a crank rotatably mounted on the adjacent end of said hollow shaft, said crank having provision for securing it to either of said shafts, and coupling pin means at the other side of said gear train for releasably coupling said output shafts together.

10. Motor operating mechanism for switches comprising, a motor driven gear train having a hollow output shaft, an output shaft for the entire mechanism having a portion extending through said hollow output shaft, a removable coupling member for releasably coupling said output shafts together, said mechanism output shaft having means associated therewith for manually rotating the shaft, and a releasable latch member for retaining said coupling member in its coupling position.

11. Motor operating mechanism for switches comprising, a motor driven gear train having a hollow output shaft, an output shaft for the entire mechanism having a portion extending through said hollow output shaft, a removable coupling pin extending through said shafts to connect them together, said mechanism output shaft having means associated therewith for manually rotating the shaft, and a gravity actuated manually releasable latch member for retaining said coupling pin in its coupling position.

12. Motor operating mechanism for switches comprising, a motor driven gear train having a hollow output shaft, an output shaft for the entire mechanism having a portion extending through said hollow output shaft, a removable coupling pin extending through said shafts to connect them together, said mechanism output shaft having an opening therein for receiving an actuating member for manually rotating the shaft, and a gravity actuated manually releasable latch member for retaining the coupling pin in its coupling position, said latch member being disposed to block the opening in the mechanism output shaft when the coupling pin is in its coupling position.

13. Motor operating mechanism for switches comprising, a motor driven gear train having a hollow output shaft, an output shaft for the entire mechanism having a portion extending through said hollow output shaft, a removable coupling pin extending through said shafts to connect them together, said mechanism output shaft having an opening therein for receiving an actuating member for manually rotating the shaft, and a gravity actuated manually releasable latch member for retaining the coupling pin in its coupling position, said latch member being disposed to block the opening in the mechanism output shaft when the coupling pin is in the coupling position and to prevent the insertion of the coupling pin into its coupling position when said actuating member is in the opening in the mechanism output shaft.

JAMES B. OWENS.

References Cited in the file of this patent

UNITED STATES PATENTS

| Number | Name | Date |
|---|---|---|
| 688,670 | McGeorge | Dec. 10, 1901 |
| 1,004,860 | Eastwood | Oct. 3, 1911 |
| 1,014,216 | Gale | Jan. 9, 1912 |
| 1,120,728 | Lutz | Dec. 15, 1914 |
| 1,685,070 | Dilks | Sept. 18, 1928 |
| 1,988,120 | Hillebrand | Jan. 15, 1935 |
| 2,385,671 | Whiting | Sept. 25, 1945 |